(12) United States Patent
Alba et al.

(10) Patent No.: US 10,430,422 B2
(45) Date of Patent: Oct. 1, 2019

(54) MEASURING THE INFLUENCE OF ENTITIES OVER AN AUDIENCE ON A TOPIC

(71) Applicant: International Business Machines Corporation, Armonk, NY (US)

(72) Inventors: Alfredo Alba, Morgan Hill, CA (US); Clemens Drews, San Jose, CA (US); Daniel Gruhl, San Jose, CA (US); Neal R. Lewis, San Jose, CA (US); Pablo N. Mendes, San Jose, CA (US); Meenakshi Nagarajan, San Jose, CA (US); Cartic Ramakrishnan, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 478 days.

(21) Appl. No.: 14/869,874

(22) Filed: Sep. 29, 2015

(65) Prior Publication Data
US 2017/0091191 A1    Mar. 30, 2017

(51) Int. Cl.
*G06F 16/00* (2019.01)
*G06F 7/00* (2006.01)
(Continued)

(52) U.S. Cl.
CPC ...... *G06F 16/24578* (2019.01); *G06F 16/243* (2019.01); *G06F 16/24573* (2019.01);
(Continued)

(58) Field of Classification Search
CPC ......... G06F 17/30864; G06F 17/30867; G06F 17/30241; G06F 17/30477;
(Continued)

(56) References Cited

U.S. PATENT DOCUMENTS 8,312,056 B1    11/2012  Peng et al.
8,412,706 B2    4/2013   McGuire et al.
(Continued)

FOREIGN PATENT DOCUMENTS

CA    WO2013123582 A1    8/2013

OTHER PUBLICATIONS

Mendez, Sonora: A Prescriptive Model for Message Authoring on Twitter, Web Information Systems Engineering—WISE 2014, Lecture Notes in Computer Science, 15th International Conference, Thessaloniki, Greece, Oct. 12-14, 2014, Proceedings, pp. 17-31, Series vol. 8787, Springer International Publishing.
(Continued)

*Primary Examiner* — Usmaan Saeed
*Assistant Examiner* — Raquel Perez-Arroyo
(74) *Attorney, Agent, or Firm* — Teddi E. Maranzano

(57) ABSTRACT

Influencers (individuals or groups) over a selected audience (observers or recipients of information, objects and/or events) on a given topic are measured based on influence features, which include a sentiment flipping influence feature indicative of ability of an audience member to influence other audience members to change their sentiment on the selected topic. Other influence features include the ability to influence others: to change followership; to express interest in a topic associated with a hashtag pioneered by the influencer, based on the effectiveness and phrasing of language used. The output of the influence engine can be a score representing the relative influence of audience members over the audience on the topic of interest. Influencers may be ranked according to their total influence score over the audience on the topic.

9 Claims, 4 Drawing Sheets

(51) Int. Cl.
G06F 16/2457 (2019.01)
G06F 16/242 (2019.01)
G06F 16/28 (2019.01)
G06F 16/951 (2019.01)
G06Q 30/02 (2012.01)
G06Q 50/00 (2012.01)

(52) U.S. Cl.
CPC ...... *G06F 16/24575* (2019.01); *G06F 16/285* (2019.01); *G06F 16/951* (2019.01); *G06Q 30/0201* (2013.01); *G06Q 50/01* (2013.01)

(58) Field of Classification Search
CPC ............. G06F 17/30675; G06F 16/287; G06F 16/358; G06F 16/2477; G06F 16/447
USPC .......................................................... 707/731
See application file for complete search history.

(56) References Cited

U.S. PATENT DOCUMENTS

| | | | |
|---|---|---|---|
| 8,543,533 | B2 | 9/2013 | Lozano et al. |
| 8,688,701 | B2 | 4/2014 | Ghosh et al. |
| 8,954,449 | B2 | 2/2015 | Nelson et al. |
| 2009/0048904 | A1 | 2/2009 | Newton et al. |
| 2009/0307057 | A1* | 12/2009 | Azout .................... G06Q 30/02 705/7.29 |
| 2012/0278476 | A1 | 11/2012 | Agrawal et al. |
| 2013/0054638 | A1 | 2/2013 | Kim |
| 2013/0086063 | A1 | 4/2013 | Chen et al. |
| 2013/0197970 | A1 | 8/2013 | Aaskov et al. |
| 2014/0019539 | A1 | 1/2014 | Novak et al. |
| 2014/0089323 | A1 | 3/2014 | Wu et al. |
| 2014/0122185 | A1 | 5/2014 | Rai et al. |
| 2014/0136521 | A1 | 5/2014 | Pappas |
| 2014/0250112 | A1 | 9/2014 | Ghosh et al. |
| 2014/0372523 | A1 | 12/2014 | Handle et al. |
| 2014/0379702 | A1* | 12/2014 | Doddavula ......... G06F 16/9535 707/723 |
| 2015/0019568 | A1* | 1/2015 | Pelsmaeker ............ G06Q 30/02 707/748 |
| 2015/0026105 | A1* | 1/2015 | Henrichsen .............. G06N 5/04 706/12 |
| 2016/0371595 | A1* | 12/2016 | Naveh ............... G06F 16/24578 |

OTHER PUBLICATIONS

Cano et al.; "Social Influence Analysis in Microblogging Platforms—A Topic-Sensitive Based Approach", IOS Press and the Authors, Department of Computer Science, The University of Sheffield, Sheffield, United Kingdom, 3o Nov. 2011, pp. 1-16.

Liu et al.; "Linear Computation for Independent Social Influence", Data Mining (ICDM), 2013 IEEE 13th International Conference on, Dec. 7-10, 2013, pp. 468-477.
Bi et al.; "Scalable Topic-Specific Influence Analysis on Microblogs", WSDM'14, Proceedings of the 7th ACM International Conference on Web Search and Data Mining, Feb. 24-28, 2014, pp. 513-522.
Zhao et al.; "A Computational Approach to Measuring the Correlation Between Expertise and Social media Influence for Celebrities on Microblogs", Advances in Social Networks Analysis and Mining (ASONAM), 2014 IEEE/ACM International Conference on, Aug. 17-20, 2014, pp. 460-463.
Cano et al.; "Social Influence Analysis in Microblogging Platforms—A Topic-Sensitive Based Approach", IOS Press and the Authors, Department of Computer Science, The University of Sheffield, Sheffield, United Kingdom, Nov. 30, 2011, pp. 1-16.
Alba et al., "Applications of Voting Theory to Information Mashups", The IEEE International Conference on Semantic Computing, Abstract, © 2008 IEEE, pp. 10-17.
Bakshy et al., "Everyone's an Influencer: Quantifying Influence on Twitter", Abstract, WSDM'11, Feb. 9-12, 2011, Copyright 2011 ACM, 10 pages.
Bogdanov et al., "The social media genome: Modeling individual topic-specific behavior in social media", Published in: 2013 IEEE/ACM International Conference on Advances in Social Networks Analysis and Mining (ASONAM 2013), Abstract, Date of Conference: Aug. 25-28, 2013, 2 pages.
Chen et al., "Scalable Influence Maximization for Prevalent Viral Marketing in Large-Scale Social Networks", Microsoft Research Technical Report, MSR-TR-2010-2, Jan. 2010, Abstract, 16 pages.
Cosley et al., "Sequential Influence Models in Social Networks", Copyright © 2010, Association for the Advancement of Artificial Intelligence (www.aaai.org), 8 pages.
Goyal et al., "Learning Influence Probabilities in Social Networks", Abstract, WSDM'10, Feb. 4-6, 2010, Copyright 2010 ACM, 10 pages.
Gruhl et al., "Information Diffusion Through Blogspace", Abstract, WWW2004, May 17-22, 2004, pp. 491-501.
Wu, "Hitting Your Targets: Influence Analytics 4", Apr. 29, 2010, Lithosphere The Lithium Community, 14 pages.
Kempe et al., "Maximizing the Spread of Influence through a Social Network", Abstract, SIGKDD'03, Copyright 2003 ACM, 10 pages.
La Fond et al., "Randomization Tests for Distinguishing Social Influence and Homophily Effects", Abstract, WWW 2010, Apr. 26-30, 2010, 10 pages.
Subbian et al., "Supervised Rank Aggregation for Predicting Influence in Networks", IBM T.J. Watson Research Center, Yorktown Heights, NY 10598, Oct. 29, 2018, arXiv:1108.4801v1 [cs.SI] Aug. 24, 2011, 8 pages.
Tang et al., "Social Influence Analysis in Large-scale Networks", Abstract, KDD'09, Jun. 28-Jul. 1, 2009, Copyright 2009 ACM, 9 pages.

* cited by examiner

MEASURING THE INFLUENCE OF ENTITIES OVER AN AUDIENCE ON A TOPIC

BACKGROUND

The present invention relates to the field of measuring the influence of entities (individuals or groups) over an audience on a given topic. Understanding the concerns and issues of customers is critical to business success. The faster a business becomes aware of a problem or concern, the better they can "get ahead" of the problem, by developing solutions and fixes, preferably before most customers even notice. With the advent of social media, it has become easier for companies to monitor feedback and concerns about their products and services. A significant issue is volume; with millions of people posting every day, how does one identify who the influencers are with regard to a given audience and topic? In other words, how does one identify the influencers whose activities/messages are more likely to resonate with certain recipients (such as a demographic subset) of the message?

SUMMARY

A computer-implemented method embodiment for identifying influencers of a selected audience on a selected topic in accordance with the present invention determines information regarding the selected audience, the selected topic, and one or more influence features. The influence features include a sentiment flipping influence feature indicative of the extent to which an audience member has influenced at least one other audience member to change sentiment on the topic. A total influence score is determined for each member of the selected audience and topic, based on the one or more influence features. One or more audience members are identified (based on their total influence score) as influencers of the selected audience on the selected topic.

In some embodiments, audience members are ranked (based on their total influence score) as influencers of the selected audience on the selected topic.

In some embodiments, an influence score is determined for an influence feature; the score is compared to a predefined minimum threshold value and if greater than the predefined minimum threshold value, the determination of the total influence score further includes the influence score for the influence feature.

In some embodiments, the influence features include a followership conversion influence feature indicative of an extent to which an audience member influenced other audience member(s) to change followership.

In some embodiments, the influence features include a hashtag pioneer influence feature indicative of an extent to which a hashtag created (pioneered) by an audience member influenced other audience member(s) to expresses an interest in the selected topic.

In some embodiments, the influence features include an effectiveness and phrasing influence feature indicative of an extent to which the effectiveness and phrasing of language used by an audience member influenced other audience member(s).

In some embodiments, the influence features are selected from a group consisting of: an adoption influence feature, a conversation influence feature, an edge and node statistics influence feature, and a network attributes influence feature.

Other embodiments of the present invention are disclosed herein, including system and computer program product embodiments.

DETAILED DESCRIPTION

By way of introduction, the following description will show various embodiments of the present invention. Conventional devices, components, techniques and other functional and individual components thereof understood by one of ordinary skill in the art may not be described in detail herein. By way of example only, the devices/servers/data sources referenced in the various embodiments herein are understood to include the conventional hardware (such as processor(s), computer memory) software, and/or firmware components configured to collectively perform the functions described herein. On the other hand, specifics are in many cases provided merely for ease of explanation and/or understanding the various embodiments and possible variations thereof.

Figure 1:
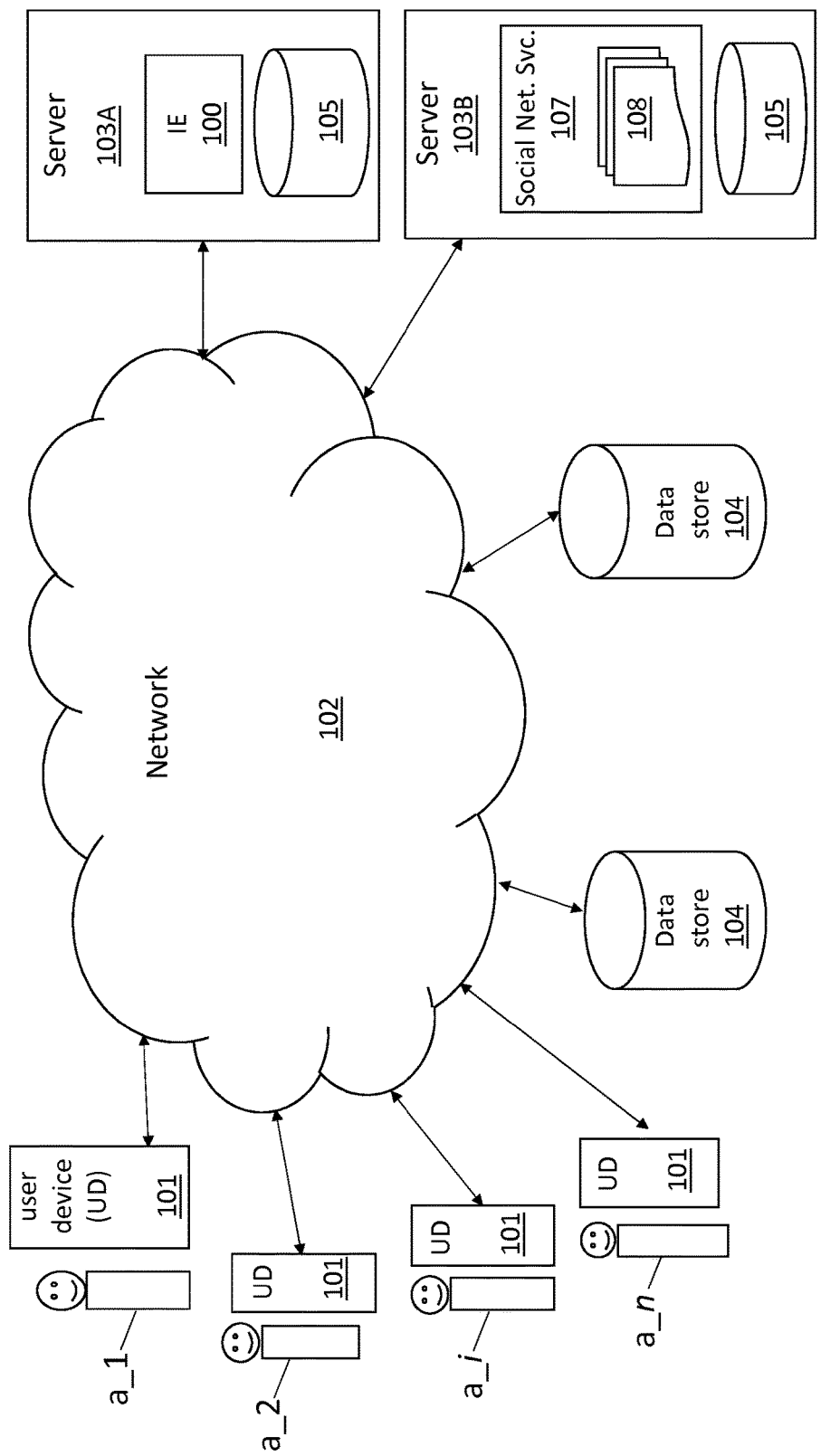
FIG. 1 illustrates an example of a network deployment of a system in accordance with the present invention.

FIG. 1 depicts an example of a system in accordance with the present invention. A plurality of user devices (UD) 101 are coupled via network 102 to servers 103A, 103B and one or remote or local data stores 104, 105. By way of example only, user devices 101 can be personal computers or interactive televisions, mobile devices such as smart phones, tablet computers, and/or personal digital assistants (PDAs). As is known, communications and information accessed by and exchanged between the various system components locally, or remotely via network 102. For example, information may be stored on or accessed from one or more user devices 101, servers 103A, 103B and/or other data bases/sources 104, 105. In this example, network 102 is the Internet but other conventional (wired and/or wireless) network(s) (or combinations thereof) will suffice, such as one or more wide area networks (WAN), medium area networks (MAN), local area networks (LAN) and personal area networks (PAN). Also as is known, one or more of devices 101 and/or servers 103A, 103B may operate as a "server" or a "client" in a server-client architecture, as a so-called "peer" device in a peer-to-peer environment, or as part of cluster or group—such as in a so-called server "farm" or "cloud." Nothing herein should be construed as limiting the numbers or types of devices or components. There can be more or less of any device component and/or different combinations thereof. Other devices and/or components, not shown, may also be present.

Referring again to the example depicted in FIG. 1, server 103A hosts an influence engine (also referred to herein as "IE") 100 in accordance with the present invention for measuring the relative influence of one or more entities (individuals or groups) a_1 . . . , a_n over an audience on a given topic. By way of example only, such entities could be members of a social media community, organization, or a group of organizations and the "audience" can be any set of entities that are observers or recipients of information, objects and/or events. By way of further example and without limitation, an audience could consist of all members of such community or organizations(s), a subset of the members of a larger community, such as an online social networking community, or a subset of the larger community membership having one or more interests, attitudes, opinions and traits of interest. A few specific examples of such traits include, without limitation, demographic (age, gender, etc.), geographic, and firm-agraphic (such as firm size, revenue, capitalization, number of employees, location, etc.) traits. In this example, the influence engine 100 is stored in computer memory and executing on processor components (not depicted) of server 103A. In some embodiments, influence engine 100 may be executing on server 103A as a stand-alone application (as depicted), integrated with social networking service 107 on server 103B, or its functionality (partially or completely) distributed across one or more of user devices 101, server 103A, server 103B and network 102. Server 103B hosts and executes a conventional online social networking community service 107, which includes social network data/objects 108 of participating user devices 101 communicatively coupled via network 102. A non-exhaustive list of such social networking services include those offered by Twitter, Inc. (www.twitter.com), LinkedIn Corporation (www.linkedin.com), YouTube, LLC (www.youtube.com) and under the Facebook® brand (www.facebook.com).

Referring again to FIG. 1, one or more users $a\_1 \ldots a\_n$ can submit requests/queries from user devices 101 over network 102 to influence engine 100. Such requests, as will be discussed in more detail below, can specify one or more request criteria/constraints, such as the audience, a topic of interest and one or more influence features. In this example, the influence engine 100 is adapted to parse and process submitted requests for measuring the relative influence (based on certain influence features) of entities over an audience and topic. In some embodiments, influence may be measured based on information and/or data/objects 108 accessible locally or remotely (via network 102) by or from one or more user devices 101, servers 103A, 103B and data bases/sources 104, 105. In some embodiments, influence feature scores may be output as raw or weighted influence scores and/or the influence engine 100 output can combine influence feature scores into a total influence score for one or more entities over the selected audience on the topic of interest. As will be discussed in more detail with reference to FIGS. 3A and 3B, influence engine 100 may also include a mechanism for ranking one or more audience members according to their measured relative total influence over the audience on the topic.

In this example, assume there is a first set of entities (individuals or groups) having members $a\_1 \ldots a\_n$. The entities $a\_1 \ldots a\_n$ (one or a subset of which are sometimes referred to herein as audience member(s) are collectively referred to as "Audience A" or "A". Audience A can be the same as or a subset of a second set of entities) having members $b\_1 \ldots b\_n$ (not depicted, but referred to herein collectively as "community B" or "B"). In some embodiments, members of A are a subset of the members of B. In such embodiments, an entity $a\_n$ (such as a user of user device 101) can be identified as the highest ranked influencer over A on a given topic if the total influence ("I") of $a\_n$ over A is greater than the influence of every member b of B over A on the topic. In some embodiments, the influence is adjusted by a margin of error ("delta"). That is:

$$I(a\_n, A) > I(b, A) - \text{delta (for all } b \text{ in } B);$$

In some embodiments, delta can be an approximation factor that considers every entity within a predefined proximity (say x %) of each other, to be of equal influence.

Figure 2:
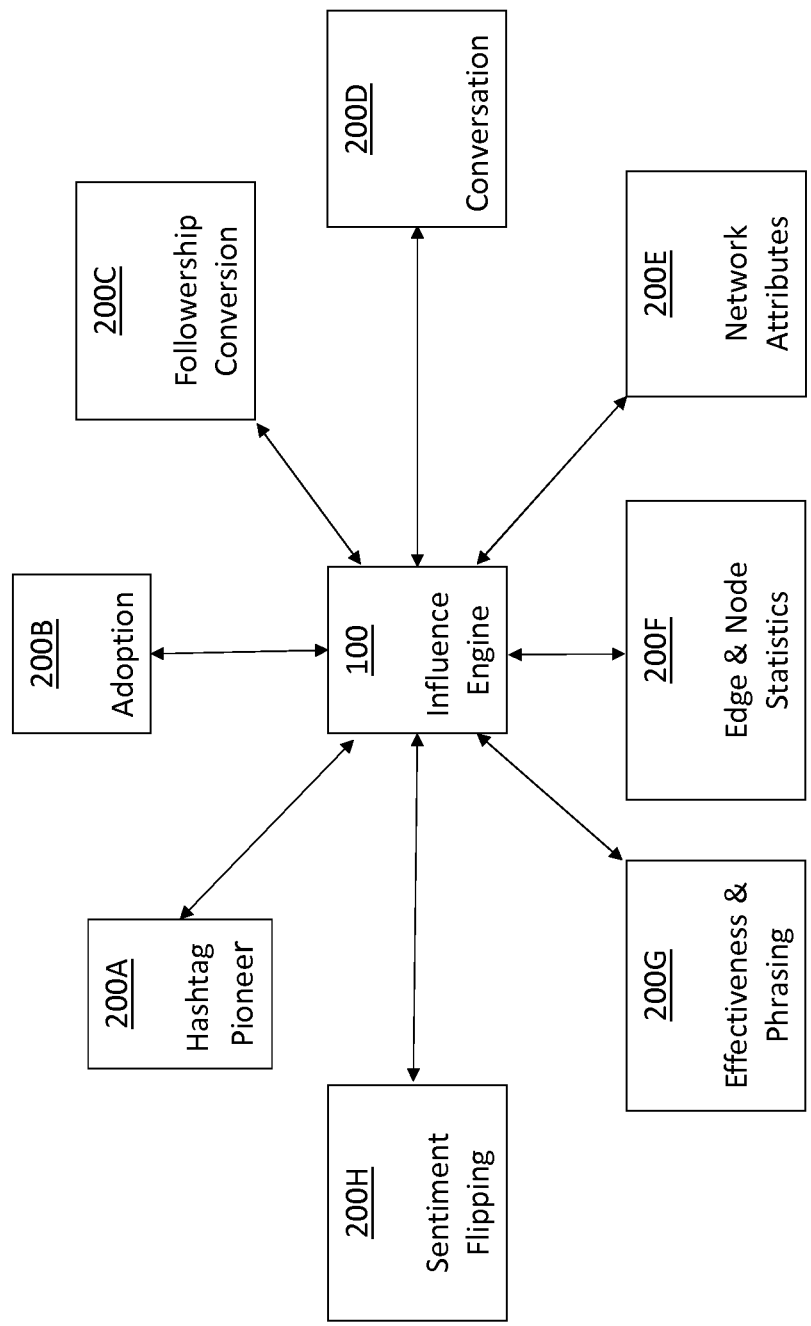
FIG. 2 illustrates an example of influence features useable by the influence engine depicted in FIG. 1.

By way of example only and without limitation, a request/query submitted from a user device 101 to influence engine 100 is to identify the ten most influential Twitter® users in the "retail" market for the "millennial" demographic. In response, the influence engine 100 parses the query and processes it based on provided and/or derived constraints. In some embodiments, influence is measured based on one or more influence features (FIG. 2, 200A . . . 200H). The intermediate or final results generated by the processing by influence engine 100 can reflect raw, intermediate, weighted, or final/total influence feature scores and can factor in other information obtained or derived by influence engine 100. In some embodiments, generated influence feature scores facilitate the ranking of influencers according to their relative influence over the selected audience and topic.

FIG. 2 depicts exemplary influence features 200A . . . 200H that can be used by influence engine (IE) 100 in the calculation of an influence score for audience members ($a\_1 \ldots a\_n$) over a the audience on the topic. As will be discussed in more detail in the examples below, the measurement of various influence features can factor in associated events, properties, and attributes of content and/or network 102. Alternatively or in addition, one or more of the influence features, components and influence feature scores can be measured, modified, weighted, filtered, combined and/or aggregated based on an observed action and/or known techniques appropriate to the topic or topic-related event, such as n-gram similarity, topic modelling similarity, and language modeling.

With reference now to FIG. 2, such influence features include but are not limited to: Hashtag Pioneer 200A, Adoption 200B, Followership 200C, Conversation 200D, Network Attributes 200E, Edge and Node Statistics 200F, Effectiveness and Phrasing 200G, and Sentiment Flipping 200H. By way of example and without limitation, such influence features with regard to an entity $a\_n$ over an Audience A on a given topic can be further understood as follows:

A Hashtag Pioneer 200A feature refers to the influence of a hashtag created/pioneered by an entity on audience members. For example, the Hashtag Pioneer 200A influence feature can be a function of the frequency of use of or interaction with the pioneered hashtag, e.g., how many times audience members click a link associated with the hashtag.

An Adoption 200B feature refers to the extent an entity influences audience members to adopt a certain position on a topic. For example, an entity could be an Adoption 200B influencer for audience member $a\_i$, if, within some time-period after a topic-related event associated with a position, $a\_i$: indicated they "like" the position on the topic; clicks on a link provided by $a\_n$ that supports the position; or received a message (originally posted by $a\_n$) forwarded/relayed/re-posted by other audience members.

A Followership Conversion 200C feature refers to the extent that a topic-related event influences audience members to change or "convert" their online "followership" or "friendship." For example, the Followership Conversion 200C feature could consider the extent that a topic-related event associated with $a\_n$ influenced $a\_i$: to follow or "friend" $a\_n$; to follow or "friend" another entity that $a\_n$ re-tweets; or to follow or "friend" another entity that $a\_n$ follows or "friends."

A Conversation 200D feature refers to the extent that a conversation on a topic involving $a\_n$ influences one or more audience members to engage in the conversation. For example, the Conversation 200D feature could factor in the number of times an audience member a_i: replies to the conversation on the topic involving a_n; or re-tweets the conversation on the topic involving a_n.

A Network Attributes 200E feature refers to the extent of homophily between audience members on the topic, such as the similarity in the preferences of such audience members. By way of example only, the Network Attributes 200E feature could consider one or more attributes of a_n and a_i, such as: tweets on similar topics: re-tweets and replies on similar topics co-followership (following similar people); and similarity in profile attributes.

An Edge & Node Statistics 200F feature refers to the extent that audience members are influenced to forward or reply to a message on a topic originated by an entity, where 'originated by' refers to the centrality of the entity in a multi-relational network of social media users (nodes) connected by network edges.

An Effectiveness and Phrasing 200G feature refers to the extent that the use and/or phrasing of language by an entity influences audience members. By way of example only, the Effectiveness and Phrasing 200G feature could be based on an audience member's use of phrasing that is attributed to the entity.

A Sentiment Flipping 200H feature refers to the extent an entity is determined to influence audience members to change or "flip" their sentiment on a topic. For example, an entity can be said to have exhibited Sentiment Flipping 200H influence on an audience member if, at time t1, the audience member expresses a certain sentiment (e.g., "like") on a topic, but later (at time t2>t1), the audience member's sentiment on the topic has changed to "dis-like" after exposure to some topic-related event associated with the entity.

Figure 3A:
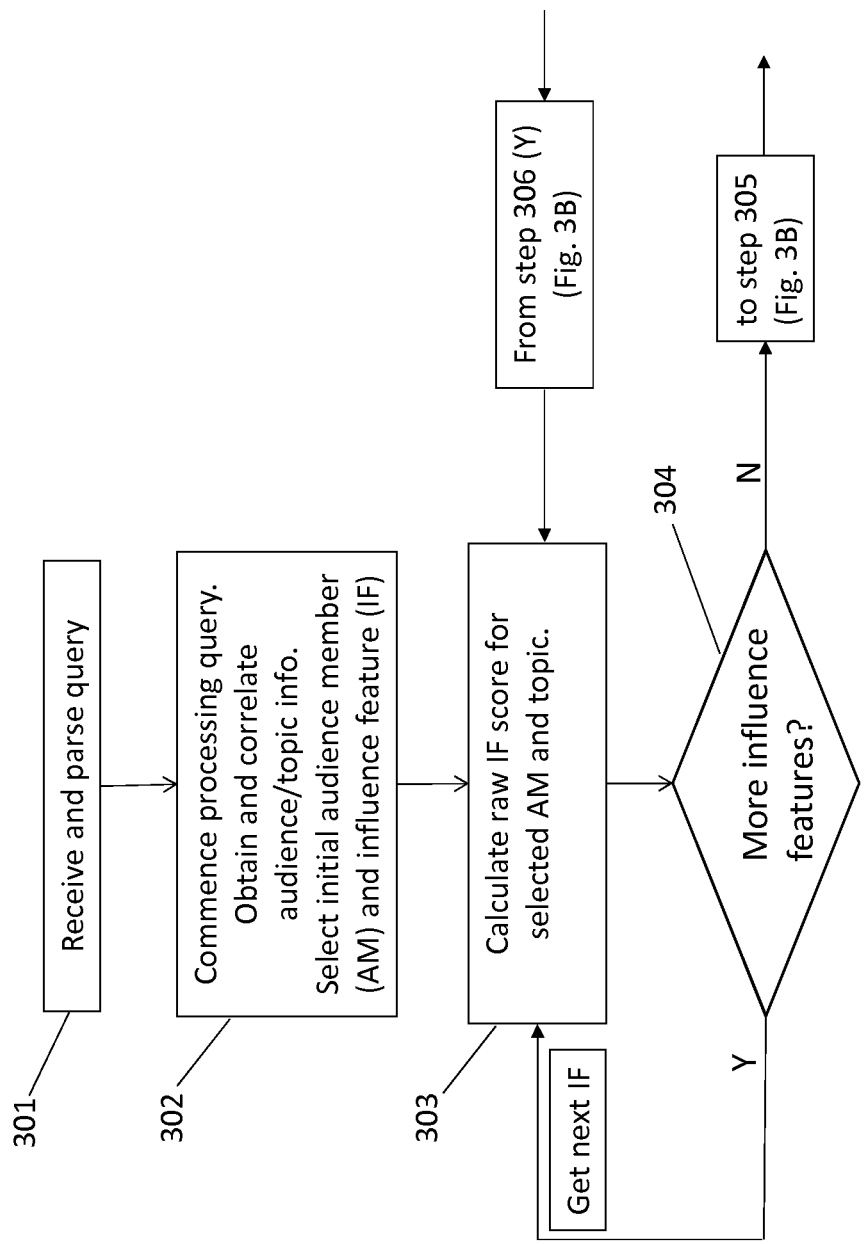
FIGS. 3A and 3B illustrate an example of a computer-implemented method in accordance with the present invention.
Figure 3B:
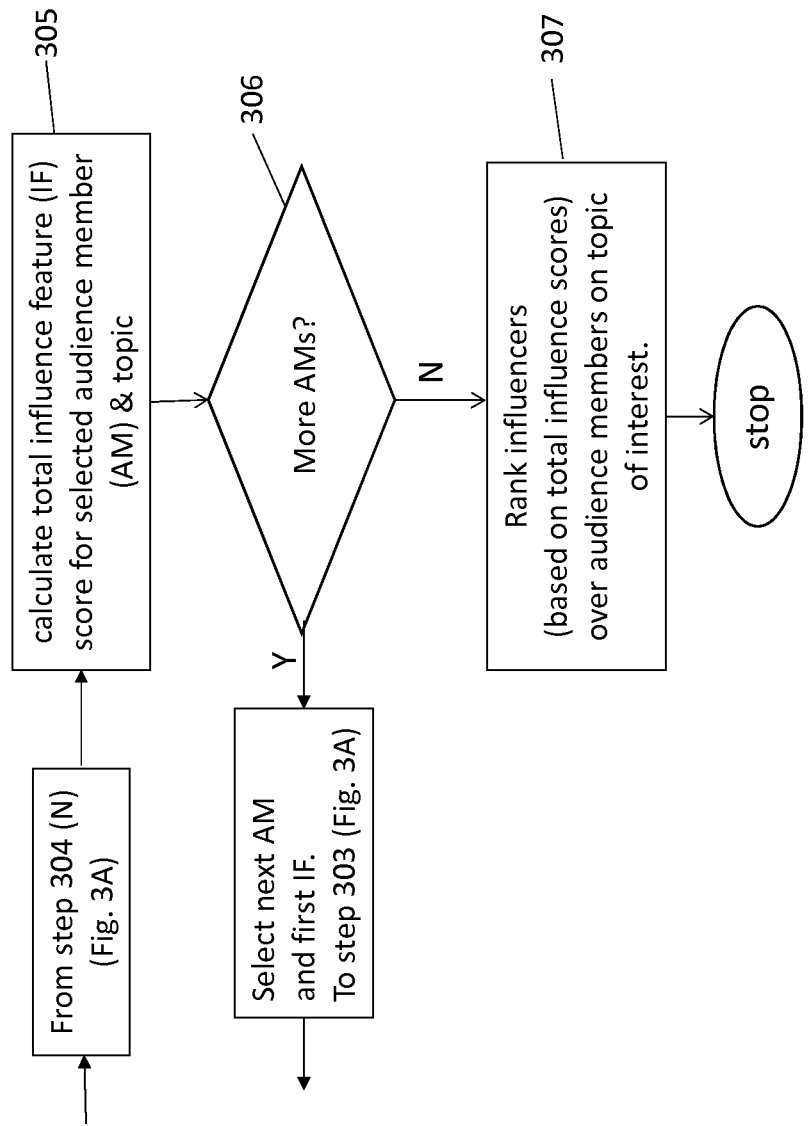

FIG. 3A and FIG. 3B collectively depict an example of a computer-implemented method in accordance with the present invention. In some embodiments, the computer implemented method can be instantiated in the form of influence engine 100 embodied as computer readable program instructions. As is known, such computer readable program instructions can be stored on computer program product (discussed in more detail below) and downloaded (via network 102) for execution on one or more of devices 101, server 103A and server 103B.

Referring now to FIG. 3A, in step 301, a query/request (in so-called "natural language") is received by influence engine 100 from a user device 101, e.g., to identify ten (10) persons that were most influential persons during the time period from 2012-2015 with regard to retail apparel purchases among users of Twitter® services in the "baby boomer" demographic. In response, influence engine 100 analytics' will parse and process the query to identify any constraints provided (such as topic, audience, time, etc.). The applicable parsed query and any other applicable information are stored in accessible computer memory and the computer-implemented process proceeds to step 302.

In step 302, influence engine 100 continues processing the query against statically specified (e.g., in the query) or dynamically derived constraints, such as influence features (FIG. 2) and applicable information stored in computer memory. In this example, we will assume that the requested Twitter audience member information may be obtained from an available data feed containing relevant information (Tweets® and "handles") of the applicable Twitter users and other publicly available information contained in other data sources 104, such as connected Facebook® profile information. The information may then be correlated to the applicable audience members (a_1 ... a_n) and the first audience member a_1 and an initial influence feature selected. In this example, the aforementioned Sentiment Flipping 200H (FIG. 2) influence feature is selected. The applicable obtained/processed information is stored in accessible computer memory and the computer-implemented process proceeds to step 303.

In step 303, an influence feature score is calculated for the selected influence feature and audience member with regard to the selected audience and topic. In this example, the influence feature score is based on information stored in computer memory, provided to and/or derived by the influence engine 100 associated with the selected influence feature.

In some embodiments, an influence feature score can have a value ranging from a predefined minimum/lowest score e.g., zero (0) and a maximum/highest score, e.g., ten (10). In some embodiments, one or more influence feature scores are initialized to some default value. In some embodiments, minimum and maximum threshold value(s) are assigned to one or more influence features and a calculated influence feature score compared to the assigned threshold value(s). For example, an audience member can be determined as insignificantly influential (and a predefined (low) score accordingly assigned) with regard to an influence feature if the calculated score is less than a minimum threshold value. On the other hand, an audience member can be determined as highly influential (and a predefined (high) score accordingly assigned) with regard to the influence feature if the calculated score is greater than the maximum threshold value. If the calculated score is greater than the minimum threshold value but less than the maximum threshold value, the calculated influence feature score is used.

In some embodiments, a calculated influence feature score is adjusted by a weighting factor to generate a weighted influence feature score. Alternatively or in addition, a default, interim or other score value and/or weighting factor may be applied or modified programmatically and/or by a system administrator (not shown). Spikes in underlying social networking data and other anomalies that can affect influence feature scores can be normalized using conventional techniques.

The calculated influence feature score for the selected entity with regard to the audience and topic of interest and any other applicable information are stored in accessible computer memory and the computer-implemented process proceeds to step 304.

In step 304, if all influence features for a selected audience member have not been scored, the next influence feature is selected and the computer-implemented process returns to Step 303. If all influence features for the selected audience member have been scored, the computer-implemented process proceeds to step 305 (FIG. 3B).

Referring now to FIG. 3B, in step 305, the influence engine 100 may generate a total influence feature score by combining e.g., summing the component influence feature scores for the selected entity and topic. In some embodiments, the total influence feature score can be calculated dynamically (on a "running" basis) as part of step 303. In this example, the sum of the component influence feature scores represent the total influence score for the entity over the audience on the topic of interest. The total influence score for the entity over the audience on the topic of interest and any other applicable information are stored in accessible computer memory and the computer-implemented process proceeds to step 306.

In step 306, if total influence scores for all entities have not been calculated, a next entity and the initial influence feature (FIG. 2) are selected and the computer-implemented process returns to Step 303. If however, total influence scores for all entities have been calculated, the computer-implemented process proceeds to step 307.

In step 307, total influence scores can be used to rank audience members' influence over the audience on the topic. The resulting ranking reflects the relative influence of each audience member (a_1 . . . a_n) with regard to other audience members on the topic. A record can be accordingly created/stored in computer memory and refreshed when deemed appropriate. In this example, in response to the request/query received in step 301, users of the Twitter service within the "baby-boomer" demographic that have the ten (10) highest total influence scores with regard to retail apparel purchases during the time period from 2012-2015, is communicated to the requesting user device 100.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have illustrated examples of architecture, functionality, and the operation of various embodiments of devices, methods, and computer program products in accordance with of the present invention. In this regard, each block in the flowchart or block diagrams may represent a module, segment, or portion of computer executable instructions for implementing the corresponding logical function(s). It is understood that the functions noted in a given block (or step) may occur in a different order from the examples described in the Detailed Description and Drawings. For example, two blocks shown in succession may, in fact, be executed substantially concurrently (and vice versa), or the blocks may sometimes be executed in the reverse order, depending upon the functionality involved. It is also understood that a block (and/or combination of blocks) of the block diagrams and/or flowcharts can be implemented by special purpose hardware-based systems and/or combinations of such hardware with computer instructions that perform the specified functions or process steps.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer implemented method comprising:
  receiving an influencer request comprising a selected audience, a selected topic, and a selected date range;
  simultaneously calculating component influence feature scores for each audience member of the selected audience corresponding to the selected topic and the date range, and storing the calculated component influence feature scores in accessible computer memory, wherein calculating the component influence feature scores comprises:
    simultaneously determining a sentiment flipping influence feature score for each audience member of the selected audience corresponding to the selected topic and the selected date range, wherein the sentiment flipping influence feature indicates an extent to which an audience member has influenced at least one other audience member to change sentiment on the selected topic;
    simultaneously determining a hashtag pioneer influence feature score for each audience member of the selected audience corresponding to the selected topic and the selected date range, wherein the hashtag pioneer influence feature indicates an extent to which at least one audience member expresses an interest in the selected topic associated with a hashtag created by each audience member;
    simultaneously determining a followership conversion influence feature score for each audience member of the selected audience corresponding to the selected topic and the selected date range, wherein the followership conversion influence feature indicates an extent to which each audience member influenced the at least one other audience member to change followership;
    simultaneously determining a conversation influence feature score for each audience member of the selected audience corresponding to the selected topic and the selected date range, wherein the conversation influence feature indicates an extent that a conversation on the selected topic involving one audience member influences one or more audience members to engage in that conversation;
    simultaneously determining an edge and node statistics influence feature score for each audience member of the selected audience corresponding to the selected topic and the selected date range, wherein the edge and node statistics influence feature indicates an extent that audience members are influenced to forward or reply to a message on the topic originated by one audience member;
    simultaneously determining an effectiveness and phrasing influence feature score for each audience member of the selected audience corresponding to the selected topic and the selected date range, wherein the effectiveness and phrasing influence feature indicates an extent to which at least one audience member was influenced by the effectiveness and phrasing of language used by each audience member;
  simultaneously determining a total influence score for each audience member of the selected audience corresponding to the selected topic and the received date range based on all of the component influence feature scores stored in the computer memory; and
  in accordance with the influencer request, identifying one or more audience members as the influencers of the selected audience on the selected topic within the selected date range, based on the total influence scores of each audience member.

2. The computer implemented method of claim 1, wherein calculating the component influence feature scores comprises: determining an adoption influence feature score for each audience member of the selected audience corresponding to the selected topic, wherein the adoption influence feature indicates an extent one audience member influences other audience members to adopt a certain position on the selected topic.

3. The computer implemented method of claim 1, wherein calculating the component influence feature scores comprises: determining a network attributes influence feature score for each audience member of the selected audience corresponding to the selected topic, wherein the network attributes influence feature indicates an extent of homophily between audience members on the selected topic.

4. The computer implemented method of claim 1, further comprising:
  comparing one of the component influence scores for at least one audience member with a first predetermined threshold value, and increasing the one component influence score for the at least one audience member in response to the one component influence score being above the first predetermined threshold value; and comparing one of the component influence scores for at least one audience member with a second predetermined threshold value, and decreasing the one component influence score for the at least one audience member in response to the one component influence score being below the second predetermined threshold value.

5. A computer implemented method comprising:

receiving an influencer request identifying an audience, a topic, and a date range;

simultaneously calculating a component influence feature score for each audience member of the audience corresponding to the topic and date range, wherein calculating the component influence feature scores comprises:

simultaneously determining a sentiment flipping influence feature score for each audience member corresponding to the topic and the date range, and storing the sentiment flipping influence feature scores in accessible computer memory wherein the sentiment flipping influence feature indicates an extent to which an audience member has influenced at least one other audience member to change sentiment on the topic;

simultaneously determining a hashtag pioneer influence feature score for each audience member corresponding to the topic and the date range, and storing the hashtag pioneer influence feature scores in accessible computer memory, wherein the hashtag pioneer influence feature indicates an extent to which at least one audience member expresses an interest in the topic associated with a hashtag created by each audience member;

simultaneously determining a followership conversion influence feature score for each audience member corresponding to the topic and the date range, and storing the followership conversion influence feature scores in accessible computer memory, wherein the followership conversion influence feature indicates an extent to which each audience member influenced the at least one other audience member to change followership;

simultaneously determining an effectiveness and phrasing influence feature score for each audience member corresponding to the topic and the date range, and storing the effectiveness and phrasing influence feature scores in accessible computer memory, wherein the effectiveness and phrasing influence feature indicates an extent to which at least one audience member was influenced by the effectiveness and phrasing of language used by each audience member;

comparing one of the component influence scores for at least one audience member with a first predetermined threshold value, and increasing the one component influence score for the at least one audience member in response to the one component influence score being above the first predetermined threshold value;

comparing one of the component influence scores for at least one audience member with a second predetermined threshold value, and decreasing the one component influence score for the at least one audience member in response to the one component influence score being below the second predetermined threshold value;

determining a total influence score for each audience member corresponding to the topic and the date range based on all of the component influence feature scores stored in the computer memory; and in accordance with the influencer request, identifying one or more audience members as the influencers of the selected audience on the selected topic within the selected date range, based on the total influence scores of each audience member.

6. The computer implemented method of claim 5, wherein calculating the component influence feature scores comprises: determining a conversation influence feature score for each audience member of the audience corresponding to the topic and the date range, wherein the conversation influence feature indicates an extent that a conversation on the topic involving one audience member influences one or more audience members to engage in that conversation.

7. The computer implemented method of claim 5, wherein calculating the component influence feature scores comprises: determining an edge and node statistics influence feature score for each audience member of the audience corresponding to the topic and the date range, wherein the edge and node statistics influence feature indicates an extent that audience members are influenced to forward or reply to a message on the topic originated by one audience member.

8. The computer implemented method of claim 5, wherein calculating the component influence feature scores comprises: determining an adoption influence feature score for each audience member of the audience corresponding to the topic and the date range, wherein the adoption influence feature indicates an extent one audience member influences other audience members to adopt a certain position on the selected topic.

9. The computer implemented method of claim 5, wherein calculating the component influence feature scores comprises: determining a network attributes influence feature score for each audience member of the audience corresponding to the topic and the date range, wherein the network attributes influence feature indicates an extent of homophily between audience members on the topic.

* * * * *